Dec. 2, 1930.  W. L. LAIB  1,783,437
WHIPPER AND MIXER
Filed Sept. 23, 1929   3 Sheets-Sheet 1

Inventor
William L. Laib
By Harry Irwin Romer
Attorney

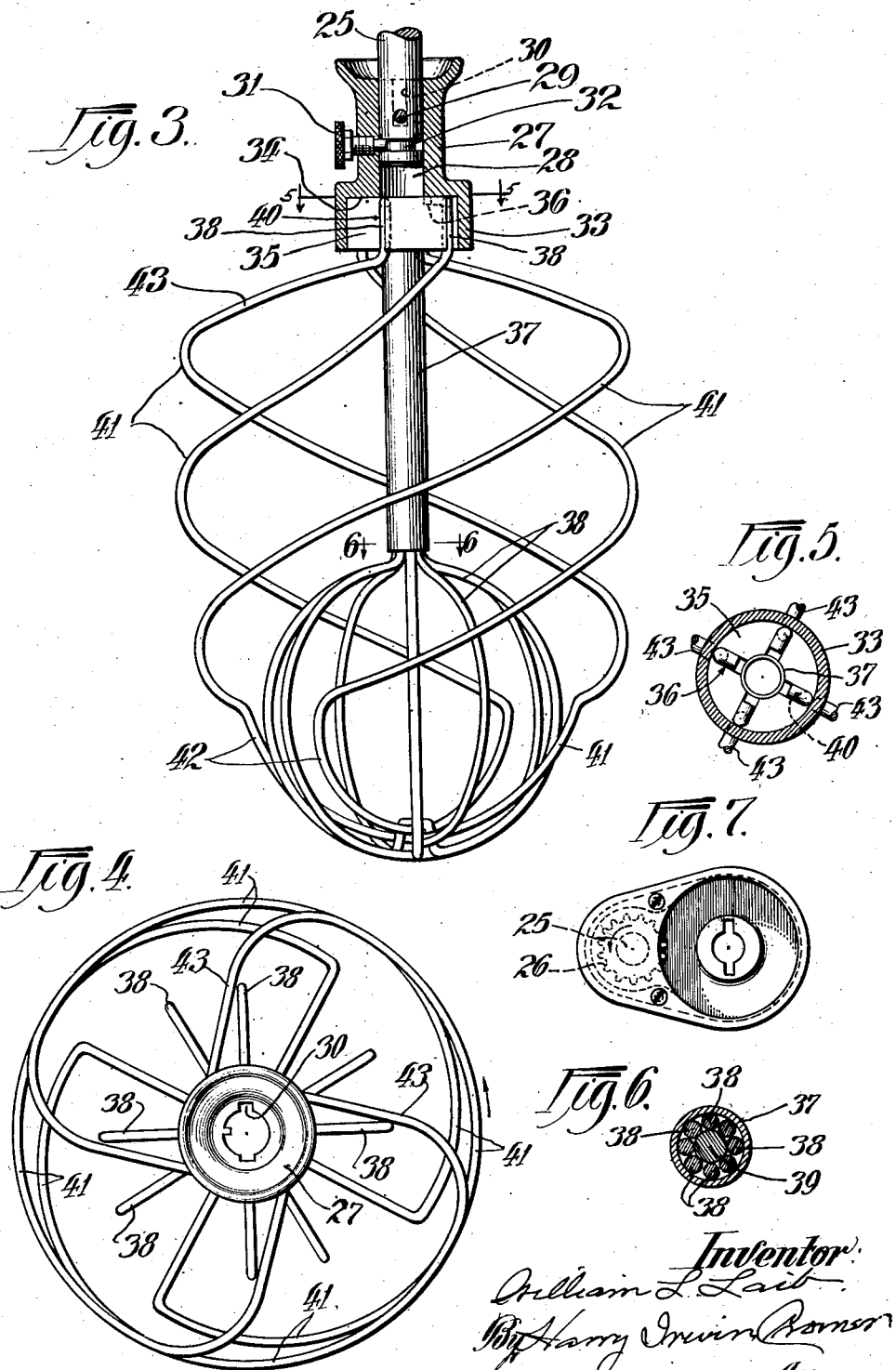

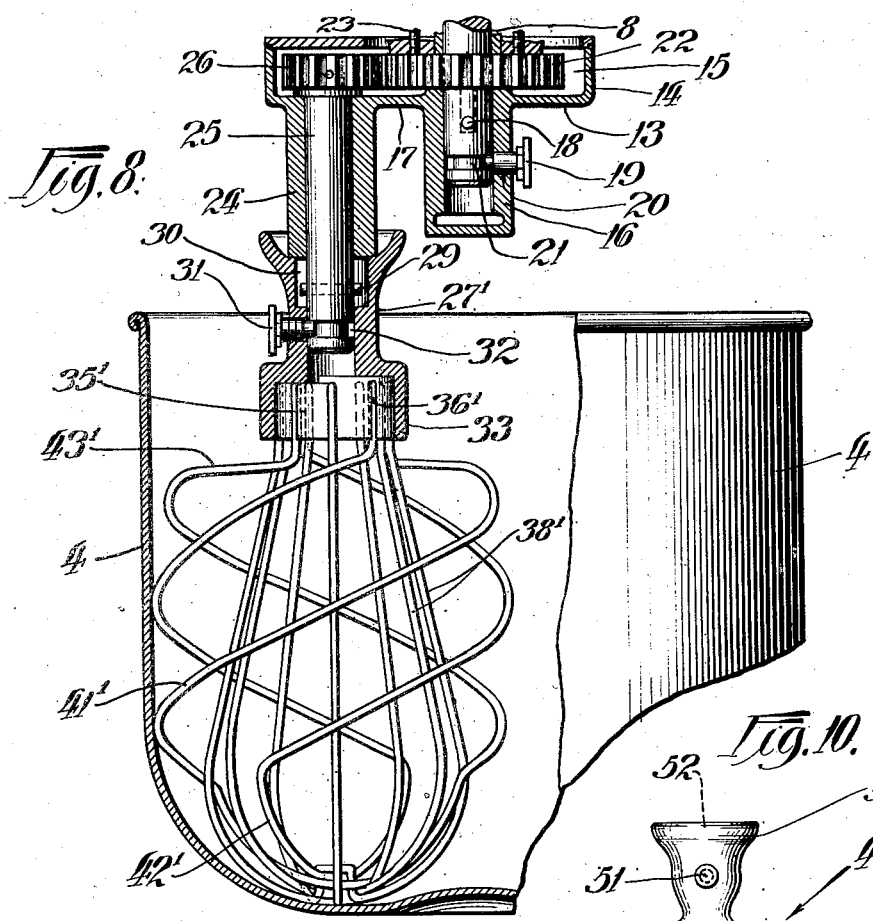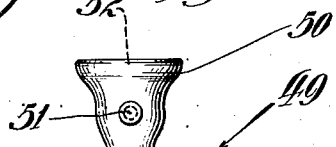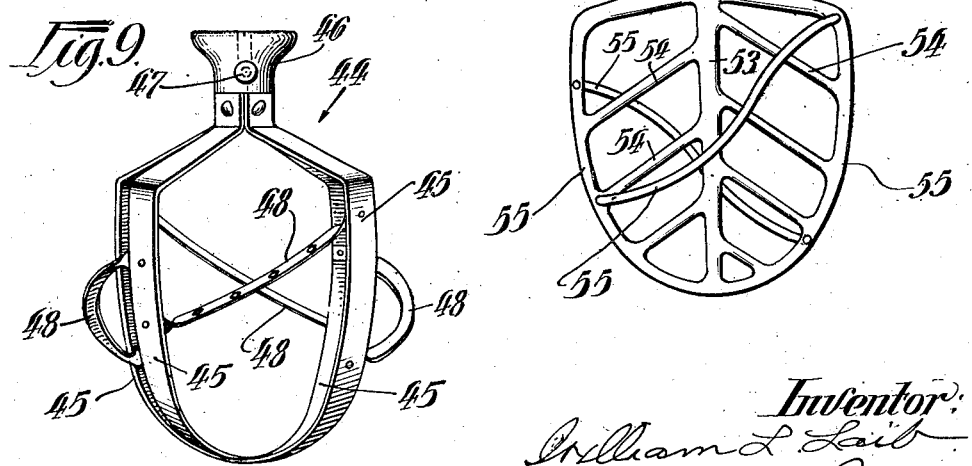

Patented Dec. 2, 1930

1,783,437

UNITED STATES PATENT OFFICE

WILLIAM L. LAIB, OF OAK PARK, ILLINOIS

WHIPPER AND MIXER

Application filed September 23, 1929. Serial No. 394,708.

This invention relates to whippers and mixers which are capable of being used for whipping, mixing or stirring, batter, eggs, dough or other material to be operated upon.

The principal object of my invention is to provide a simple, economical and efficient whipper or mixer, for whipping, mixing and stirring or treating batter, eggs, dough or other material.

A further object of the invention is to provide an improved whipping or mixing device which comprises a rotative whipper supported and adapted to rotate upon a vertical axis while revolving in a circular path, thus having a planetary movement within a container for holding the material to be operated upon, and having inclined or helical whipper frame portions associated with radial and upwardly and downwardly extending whipper frame members and adapted to whip, stir, break up and thoroughly and uniformly mix batter, eggs, dough or other material to be operated upon; and more particularly to provide an improved whipper and mixer which is adapted to break up and whip and mix the material by passing therethrough with the required force and speed and in the required directions of movement of the whipper relatively to the directions of movement of the material, to produce an improved food product, and to dissolve and prevent accumulations of plastic, or adhesive materials or mixtures from gathering within or upon the inner wall of the container.

Other and further objects of the invention will appear from the following description and claims and from an inspection of the accompanying drawings which are made a part hereof.

The invention consists of the features, combinations, details of construction and arrangement and mode of operation of the parts, as herein described and claimed.

In the accompanying drawings:—

Fig. 3 is an enlarged detail view in elevation of an improved rotative whipper and mixer constructed in accordance with my invention;

Fig. 4 is a top plan view of the device shown in Fig. 3;

Fig. 5 is a detail view in horizontal section taken on line 5—5 of Fig. 3, looking downward;

Fig. 6 is a detail view in horizontal section taken on line 6—6 of Fig. 3, showing the means for fastening the ends of the inner upwardly and downwardly extending curved whipper members;

Fig. 7 is a detail view in horizontal section, taken on line 7—7 of Fig. 1, showing the planetary gear frame and housing;

Fig. 8 is a detail view in central vertical section showing the planetary gear frame and gear mechanism as it would appear in section taken on line 8—8 of Fig. 2, with the gear wheels and shafts shown in side elevation, and with a modified form of rotative whipper supported on and operatively connected with the planetary gear mechanism;

Figure 2:
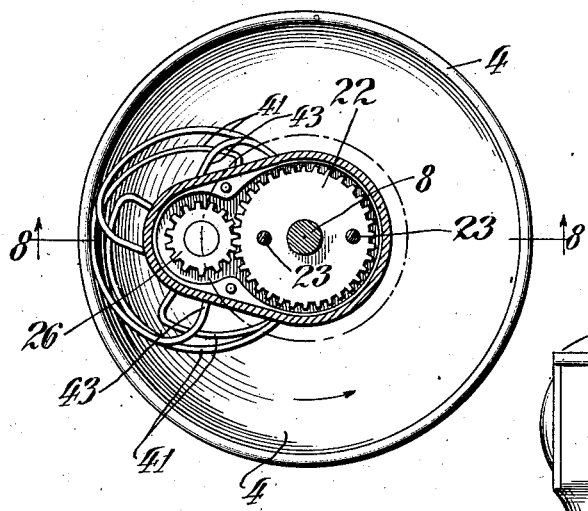
Fig. 2 is a detail view in horizontal section, taken on line 2—2 of Fig. 1, looking downward as indicated by the arrows, and showing my improved rotative whipper and mixer in operative position in a container and operatively connected with a planetary gear mechanism.

Fig. 9 is a view in side elevation of another form of rotative whipper and beater provided with helical peripheral whipper members constructed in accordance with my invention; and Fig. 10 is a view in side elevation of another modification showing a rotative whipper and mixer provided with a pair of helical peripheral whipper members associated with upwardly and downwardly extending radial whipper frame members and adapted to pass through and divide the material in accordance with my invention.

In constructing a mixing machine provided with a power-driven whipper and mixer constructed and adapted to operate in accordance with this invention, I provide a machine frame 1 which may be of any ordinary and well known or suitable form and comprises a base 2 and an upright frame portion or pedestal 3 of any suitable form. A container or bowl 4 is adjustably supported on the frame by means of an upwardly and downwardly adjustable bracket 5 having forked bracket arms 6 on opposite sides of and adapted to support the bowl.

A gear casing or housing 7 on the upright frame portion 3 projects forward over the bowl and is adapted to contain and enclose suitable driving and controlling mechanism for operating my improved whipper and mixer.

The driving mechanism enclosed within the gear casing 7 comprises an upright power-driven shaft 8 which is journaled in suitable bearings in and projects downwardly from the gear casing or housing 7 over and in concentric relation to the container or bowl; and said upright shaft is operatively connected with and adapted to be driven by an electric motor 9 by means of a suitable train of gears, including speed changing gear and clutch mechanism—not shown—which may be of any desired ordinary and well known or suitable form, and comprises a gear shaft and operating clutch lever 10 fixed to and adapted to operate the shaft 11 for operating the clutch and gear mechanism to change the speed and operatively connect the shaft 8 with the driving gear mechanism and motor and disconnect the same as required. The motor is adapted to be connected with a suitable source of electric supply by means of electric wires 12 and forms a convenient and efficient source of power for operating an improved whipping and mixing device constructed in accordance with my invention.

Fixed to the downwardly projecting end of the upright shaft 8 is a planetary gear frame or casing 13 which comprises an upper hollow portion or housing 14 forming a gear chamber 15. A rigid depending socket or tubular sleeve portion 16 projects downward from and may be integral with the radial bottom frame portion 17, and is adapted to enclose the bottom extremity of the shaft 8 to which said planetary gear frame is rigidly secured by means of a transverse pin 18 which extends through suitable openings in the shaft and said socket member, or other suitable securing means. In the form of the device shown in Fig. 8, a headed laterally projecting locking pin or bolt 19 is mounted in an opening 20 in the peripheral wall of the socket 16, and extends into a circumferential peripheral slot 21 in said shaft 8 thus forming a convenient means for releasably securing the planetary gear frame upon and in rigid relation to the bottom extremity of the upright rotative shaft 8.

A stationary non-rotative spur gear wheel 22 is mounted in the gear chamber 15 and loosely encircles the upright shaft 8, said gear being rigidly secured to the gear casing or housing 7 by securing bolts or pins 23 which extend through suitable opening in the gear and are anchored in the bottom of the gear casing or housing 7. The shaft 8, stationary gear wheel 22 and socket or sleeve 16 are concentric; and the shaft 8 comprises and forms the vertical axis of rotation of the planetary gear frame 13 which is adapted to rotate with the shaft and revolve around the said stationary gear.

An eccentric depending bearing sleeve 24 projects downward from and may be integral with the radial bottom frame portion 17 of the planetary gear frame 13; and an upright stub shaft 25 is journaled in said bearing sleeve 24 and provided with a spur pinion 26 fixed to the upper extremity of the said stub shaft and in toothed engagement with the stationary non-rotative spur gear 22. The stub shaft 25 is thus adapted to rotate upon its own axis and to revolve with the planetary gear frame 13 around the stationary gear 22.

An improved whipper and mixing device adapted to be operatively connected with and operated by the planetary gear mechanism and driving mechanism above described, in accordance with my invention, is shown in Figs. 1 to 6 inclusive and comprises a tubular shank or socket member 27 having a vertical axial bore 28 which is adapted to admit the lower extremity of the upright stub shaft 25 to which the shank or socket member is intended and adapted to be releasably secured.

The shank or socket member 27 is provided with suitable means for releasably securing said shank and the rotative whipper of which the shank forms a part, to the planetary gear mechanism for driving and operating the whipper. For example, a transverse pin 29 extends transversely through and projects beyond the periphery of the stub shaft 25 on opposite sides of said shaft; and the shank 27 is provided with vertically elongated inner peripheral grooves or slots 30 on opposite sides of the shaft 25 and in position to releasably engage the projecting ends of said pin 29. A headed securing pin or bolt 31 is mounted on and by preference in a screw threaded opening in the shank or socket 27, and extends into a circumferential groove or slot 32 in the lower extremity of the upright stub shaft 25, for releasably connecting and holding the socket and the whipper of which the socket forms a part, in operative position upon the shaft.

The shank or socket member 27 is provided with an annular bottom end flange 33 which surrounds an enlarged bottom axial opening 34 into which is tightly fitted a cylindrical plug or bushing 35 having a series of vertical elongated peripheral grooves 36 in its cylindrical peripheral face, for receiving and securely holding rigidly in place between said grooved plug and annular flange, any desired number of whipper members adapted to form a whipper constructed in accordance with my invention.

The rotative whipper shown in Figs. 1 to 6 inclusive, is provided with a central upright tubular stem 37 the upper end of which is fixed to and may be formed integrally with the peripherally grooved securing plug 35. The plug and upright hollow stem thus form a depending central tubular extension of the shank or socket member 27. The tubular stem may be of any desired suitable length necessary to provide the required rigidity and strength for sustaining and resisting the stresses and strains to which the whipper is subjected in use.

Mounted upon and depending from the lower extremity of the tubular stem or extension 37 is a series of upwardly and downwardly extending whipper members 38 which are, by preference, in the form of any desired number of upright radial wire loops having curved or U-shaped radial bottom portions which are crossed and interlaced and firmly secured together at their bottom axial centers which coincides with the vertical axis and center of the rotative whipper. The upper ends of the upwardly and downwardly extending radial loops or whipper frame members 38 are connected and secured together and to the lower extremity of the upright depending tubular stem 37 by being inserted into the axial bottom end opening in said tubular stem in parallel relation to each other and, by preference, in contact with each other and with the inner face of the tubular stem around the axial center of the stem. An upright central securing pin 39 is inserted into the center of the end opening in the tubular stem between and in binding contact with the inner sides of the tube-encircled end portions of the said upwardly and downwardly extending radial whipper frame members or loops 38, which are thus rigidly secured between the securing pin 39 and the side wall of the tubular stem. The parts thus connected may be soldered or welded together to reenforce and strengthen the connection of the parts.

The upwardly and downwardly extending peripheral frame portions 40 of the upright radial frame members or loops 38 are uniformly spaced apart circumferentially and adapted to provide spaces therebetween whereby material to be operated upon is permitted to move through the whipper and outward through said spaces and between said upright whipper frame members on all sides of the whipper.

The rotative whipper is provided with at least one and, by preference, a plurality of helical inclined peripheral whipper members or blades 41 which are attached to and adapted to rotate with and are supported by the shank or socket 27 and frame members 38 above described. These helical whipper members are, by preference, formed of wire bent to form curved radial U-shaped bottom portions 42 which are crossed and interlaced and connected with each other and with the curved converging radial bottom portions of the upright radial inner whipper frame members or loops 38 at the axial center and bottom end of the whipper.

The upper ends of the helical peripheral members or blades 41 are firmly secured together and to the shank or socket 27 by being inserted into the elongated peripheral grooves 36 in the central plug 35 already described, and tightly clamped in said grooves between the periphery of the plug and the depending bottom annular end flange 33 of the shank. These helical peripheral whipper members 41 are inclined and helically curved upward and forward at an oblique angle relatively to the upright radial frame members or loops 38 and in the direction of rotation of the whipper upon its vertical axis. The helically curved portions of the helical members 41 extend upward and around the periphery of the rotative whipper from the integral upper extremities of the lower curved radially disposed U-shaped bottom portions 42 to the upper end portions 43 which extend inward at an angle toward the axial center of the whipper and are firmly secured to the shank or socket 27 and grooved plug 35 as already described.

These helically curved peripheral whipper members 41 are uniformly spaced apart, and, with the upwardly and downwardly extending radially disposed whipper frame portions, form a rotative whipper the periphery of which conforms substantially in its general outline to the shape of the inner face of the side wall of the container in which the whipper is supported and adapted to be operated by the planetary frame and gear and shaft mechanism above described, or other suitable whipper-operating mechanism.

From the foregoing it will be readily understood by those skilled in the art that the upright radially disposed whipper frame members or loops 38 act to whip and stir and mix the material to be operated upon, and tend to force said material to pass between the spaced-apart whipper frame members and through the whipper frame and outward from the periphery of the whipper on all sides of the same. The radial peripheral whipper members 41 being inclined and helically curved upward and forward at an oblique angle in the direction of rotation of the whipper upon its vertical axis, are adapted to pass through and at an angle to the direction of movement of the material as said material is forced outward from the periphery of the whipper and between the upwardly and downwardly extending whipper frame members 38. My improved whipper provided with upright radially disposed circumferentially spaced-apart whipper members such as the whipper members 38, and with helical peripheral whipper members 41 is adapted to remove and prevent the accumulation of lumps of material within the container or upon the inner walls of the container, thoroughly and uniformly whip, mix, stir and knead batter, eggs, dough or other material.

Figure 1:
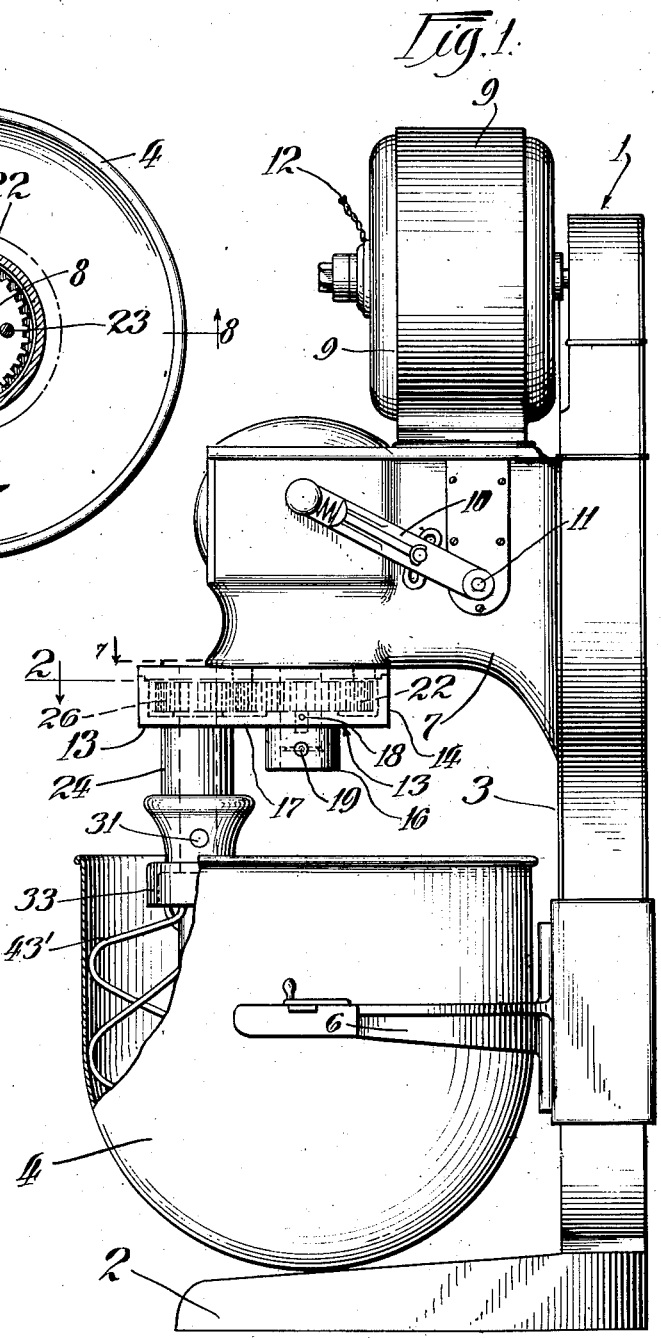
Figure 1 is a view in side elevation of a mixing machine provided with an improved power-driven whipper and mixer constructed in accordance with my invention.

In the form of whipper constructed in accordance with my invention as shown in Fig. 8, a shank or socket member 27′ is provided which is identical in construction and in all substantial respects with the shank or socket member shown in Figs. 1, 3 and 4, as already described.

Mounted upon and depending from the tubular shank or socket member 27′, as shown in Fig. 8, is a series of upwardly and downwardly extending whipper members 38′ which comprise any desired number of upright radial wire loops having curved U-shaped radial bottom portions which are crossed and interlaced and firmly secured together at their bottom axial centers which is at the center of rotation of the whipper upon its vertical axis.

The upper ends of the upwardly and downwardly extending whipper frame member 38′ are connected and secured together and to the shank or socket member 27′ by being inserted into the peripheral vertically elongated grooves 36′ in the plug or bushing 35′ and tightly clamped in said grooves between the plug 35′ and the annular depending peripheral end flange 33′ of said shank 27′.

The upwardly and downwardly extending peripheral side frame portions of the said frame members 38′ are uniformly spaced apart circumferentially and adapted to provide spaces therebetween through which the material operated upon is permitted and caused to move through the whipper and between said upright peripheral frame members on all sides of the whipper when the latter is rotated upon its vertical axis with the whipper supporting and operating upright shaft 25 and caused to revolve with the planetary gear frame and gear and shaft mechanism which is operatively connected with and adapted to drive said shaft 25 and the whipper supported thereby, as already described.

The rotative whipper shown in Fig. 8 is provided with a plurality of helical curved inclined peripheral whipper members 41′ which are attached to and adapted to rotate with and are supported by the shank or socket 27′ and frame members 38′.

These helical whipper members 41′ are of identically the same construction in all substantial respects with the helical whipper members 41 already described, and are formed of wire bent to form curved radial U-shaped bottom portions 42′ which are crossed and interlaced and connected with each other and with the curved radial bottom portions of the whipper frame members or loops 38′ at the axial center and bottom end of the whipper.

The upper ends of the helical peripheral whipper members 41′ are firmly secured together and to the shank or socket 27′ by being inserted into the elongated peripheral grooves 36′ in the central plug 35′ already described, and are tightly clamped in said grooves and between the periphery of the plug and the plug-encircling depending annular flange 33′ on the shank.

The helical curved portions of the helical peripheral whipper members 41′ shown in Fig. 8 are identical with the corresponding portions of the helical whipper members 41 shown in Fig. 3 and are uniformly spaced apart circumferentially, and with the upwardly and downwardly extending radially disposed whipper frame portions or loops 38′ form a rotative whipper the curved sides of which conform substantially with the shape of the inner side wall of the container in which the whipper is supported and adapted to be operated.

The modified form of improved whipper shown in Fig. 9 comprises a metallic frame 44 formed of two substantially U-shaped radially disposed upwardly and downwardly extending whipper frame members 45 which are disposed at an angle of 90 degrees relatively to each other and are concentric. The U-shaped whipper frames 45 are bent to form curved radially disposed converging and crossed bottom portions, the upper extremities of said crossed U-shaped frames 45 being bent at an angle to the outer peripheral portions of the frames and adapted to extend inward to a supporting tubular or sleeve-shaped supporting shank or socket member 46 to which they are rigidly secured by rivets or other suitable securing means.

The shank 46 is adapted to be releasably attached to a shaft 25 by a securing screw 47 in the same manner in which the shank or socket member 27 is attached to said shaft.

The whipper shown in Fig. 9 is also provided with a plurality of helical curved peripheral whipper members 48 the bottom rear end of each of said helical members being fixed to one of the connected U-shaped frames 45 near the bottom extremity thereof, and the other end being fixed to the next adjacent frame 45 near the top thereof. The helical peripheral beater members 48 are uniformly spaced apart and connected at top and bottom with the periphery of the rotative frame formed by the connected concentric U-shaped frame members 45. The upright crossed frame members 45 and the helical frame members 48 are thus adapted to pass through the material to be operated upon at different angles and to thoroughly stir, whip, mix and knead batter, eggs, dough or other material. The beater shown in Fig. 9 is also adapted to break up and stir and remove and prevent the accumulation of lumps or caked material within and in contact with the inner walls of the container.

The modified form of improved whipper or mixer shown in Fig. 10 comprises a metallic frame 49 which is substantially flat and U-shaped, said frame being attached at its upper end to or formed in one integral piece with a sleeve-shaped supporting shank or socket 50 which is provided with a securing screw 51 adapted to releasably engage the circumferential groove 32 in the upright rotative shaft 25 on the planetary gear frame 13 already described, for attaching the shank and whipper in fixed relation to said rotative shaft. The shank 50 is also provided with vertically elongated inner grooves 52 for engaging the transverse pin 29 on the shaft 25, for releasably holding the shaft and whipper in operative fixed relation to each other.

The U-shaped whipper frame 49 has an integral central upright stem 53 and integral radial ribs 54 which extend outward radially on diametrically opposite sides of the axial center of the frame, the ribs being spaced apart and connected at their inner ends with the vertical axial stem 53 and at their outer ends with the upwardly and downwardly extending peripheral integral marginal frame portions 55. The curved bottom marginal rim of the frame is disposed radially and extends transversely across the axial center of the frame.

The whipper frame 49 is provided with a plurality of helical curved peripheral whippers 55 the bottom rear end of each of which is fixed to one of the side margins of the upright radially disposed frame 49 and the upper forward ends of the same being each fixed to the opposite side margin of the radially disposed frame and near the upper extremity of the same. The upright radial frame 49 and the helical peripheral whipper members 55 are thus adapted to pass through the material to be operated upon at different angles. The upright radially disposed frame acts to pass through and stir and force the material to pass through and outward on all sides of the rotative frame; and the helical peripheral whippers 55 are adapted to pass through the material at an angle to the direction of movement of the material and in such a manner as to tend to break up and stir and cause a downward movement of the material within the container.

I claim:

1. In a device of the class described, a whipper comprising a plurality of upwardly and downwardly extending peripheral frame portions spaced apart circumferentially and adapted to rotate upon a vertical axis, and an inclined peripheral whipper member mounted in engagement with and extending outside of and in oblique relation to said spaced-apart peripheral frame portions and adapted to rotate around the said axis.

2. In a device of the class described, a whipper comprising connected frame members having upwardly and downwardly extending peripheral frame portions spaced apart circumferentially and adapted to rotate upon a vertical axis, and a helical peripheral whipper member extending upward at an incline in oblique relation to and on the outside of said spaced-apart peripheral frame portions and said vertical axis and adapted to rotate around said axis.

3. In a device of the class described, a whipper comprising a plurality of upwardly and downwardly extending connected frame members having curved peripheral frame portions spaced apart circumferentially and adapted to rotate upon a vertical axis, a helical peripheral whipper frame member connected with and extending at an oblique angle with respect to and on the outside of said first-mentioned spaced-apart peripheral frame portions and adapted to rotate therewith and means for connecting the whipper with mechanism for driving the same.

4. In a device of the class described, a whipper comprising a plurality of connected upwardly and downwardly extending frame portions spaced apart circumferentially and forming a frame which is adapted to rotate upon a vertical axis, an inclined peripheral whipper member connected and adapted to rotate with said frame and extending upward at an oblique angle relatively to and on the outside of said spaced-apart frame-portions and said vertical axis and adapted to rotate around said vertical axis, a rotative upright driving shaft, and means for releasibly connecting said whipper with said shaft.

5. In a device of the class described, a whipper comprising a socket member having a peripheral flange and provided with a bottom opening surrounded by said flange, a plurality of upwardly and downwardly extending radial frame members spaced apart circumferentially and forming a frame which is adapted to rotate upon a vertical axis, the upper ends of each of said radial frame members being located within said opening and in engagement with said flange, a central plug having peripheral grooves adjacent to said flange and adapted to receive and hold said upper ends of said radial frame members between said plug and flange, and a plurality of curved helical peripheral whipper members mounted in concentric relation to and extending at an oblique angle with respect to said radial frame members and said vertical axis and adapted to rotate around said axis.

6. In a device of the class described, a whipper comprising a socket member having a peripheral flange and provided with a bottom opening surrounded by said flange, a plurality of depending whipper frame members fixed to said socket member and having peripheral upwardly and downwardly extending frame portions spaced apart and adapted to rotate upon a vertical axis, a helical peripheral whipper member supported on said socket member and extending obliquely with respect to said spaced-apart peripheral frame portions and adapted to rotate with the same upon said axis, the upper ends of said helical member being located within said opening and surrounded by said flange, and a grooved plug mounted within said opening and in engagement with the upper ends of said helical member and adapted to hold the latter in position upon said socket member.

7. In a device of the class described, a whipper comprising a socket member, a plurality of depending frame members fixed to said socket member and having curved radial bottom portions and spaced-apart peripheral upwardly and downwardly extending peripheral frame portions forming a whipper frame which is adapted to rotate upon a vertical axis, means for connecting the curved radial bottom portions of said frame members, a plurality of helical peripheral whipper frame portions attached to and extending upward at an incline in oblique relation to and on the outside of said upwardly and downwardly extending peripheral frame portions and adapted to rotate with said socket and connected depending frame members, a rotative upright driving shaft, and means for connecting said socket member with said shaft.

8. In a device of the class described, a rotative whipper comprising an inclined helical peripheral whipper member which extends upward and forward at an oblique angle with respect to the direction of rotation of said whipper, a rotative whipper supporting member, means for supporting said whipper member upon and in rotative relation to said support, and means for causing the simultaneous rotation of said rotative whipper member and said whipper respectively upon their respective axes.

9. In a device of the class described, a whipper comprising a rotative frame having a helical peripheral whipper member which extends upward and forward at an oblique angle relatively to the direction of rotation of the whipper, planetary gear mechanism comprising a gear-supporting frame adapted to rotate upon a vertical axis, means for supporting said whipper upon and in rotative relation to said supporting frame, and means for causing the said rotative whipper-supporting member and whipper to rotate simultaneously upon their respective axes.

10. In a device of the class described, a stationary frame, rotative planetary gear mechanism comprising an upright shaft journaled in said frame and adapted to rotate upon a vertical axis, a planetary gear frame fixed to and rotative with said shaft, a rotative whipper comprising a helical peripheral whipper member adapted to extend upward and forward at an oblique angle to the direction of the rotative peripheral movement of said whipper, and means for rotating said supporting frame and whipper simultaneously upon their respective axes.

11. In a device of the class described, the combination of a stationary frame, a container, a rotative planetary gear frame mounted in said stationary frame and adapted to rotate upon a vertical axis concentric to said container, a whipper rotatively supported upon said planetary gear frame, said whipper comprising helical peripheral whipper members adapted to rotate upon a vertical axis which is eccentric to the vertical axis of said planetary gear frame, and means for rotating said planetary gear frame and whipper upon their respective axis, said means including means for causing said whipper to revolve around the said axis of the planetary gear frame simultaneously with the rotation of said whipper upon its axis.

12. In a device of the class described, the combination of a stationary frame, a planetary gear-supporting frame mounted upon said stationary frame and adapted to rotate upon a vertical axis, a whipper rotatively mounted upon said planetary gear frame and adapted to rotate upon a vertical axis which is eccentric to the axis of rotation of the planetary gear frame, said whipper comprising helical peripheral whipper frame members which extend upward at an oblique angle to the direction of movement of the whipper and gear mechanism operatively connected with said planetary gear-supporting frame and said whipper and adapted to cause the same to rotate simultaneously upon their respective axes.

Signed at Chicago, in the county of Cook and State of Illinois, this 14th day of September, 1929.

WILLIAM L. LAIB.